United States Patent
Bell et al.

(10) Patent No.: US 10,642,063 B2
(45) Date of Patent: May 5, 2020

(54) METHODS AND SYSTEM FOR PERFORMING COLOR FILTER OFFSETS IN ORDER TO REDUCE MOIRE INTERFERENCE IN A DISPLAY SYSTEM INCLUDING MULTIPLE DISPLAYS

(71) Applicant: Pure Depth, Inc., Redwood City, CA (US)

(72) Inventors: Gareth Paul Bell, Auckland (NZ);
John D. Newton, Auckland (NZ);
James S. Emslie, Auckland (NZ);
Darryl Singh, Auckland (NZ)

(73) Assignee: Pure Depth, Inc., Redwood City, CA (US)

( * ) Notice: Subject to any disclaimer, the term of this patent is extended or adjusted under 35 U.S.C. 154(b) by 0 days.

(21) Appl. No.: 16/224,842

(22) Filed: Dec. 19, 2018

(65) Prior Publication Data
US 2019/0121151 A1  Apr. 25, 2019

Related U.S. Application Data

(62) Division of application No. 15/281,381, filed on Sep. 30, 2016, now Pat. No. 10,234,691.
(Continued)

(51) Int. Cl.
*G02F 1/1335* (2006.01)
*G02B 30/52* (2020.01)
(Continued)

(52) U.S. Cl.
CPC ........... *G02B 30/52* (2020.01); *G02F 1/1347* (2013.01); *G02F 1/13363* (2013.01); *G02F 1/133504* (2013.01); *G02F 1/133512* (2013.01); *G02F 1/133514* (2013.01); *G02F 1/133528* (2013.01); *G09G 3/3607* (2013.01); *H04N 13/324* (2018.05); *H04N 13/395* (2018.05); *G02F 1/133526* (2013.01); *G02F 2001/13356* (2013.01); *G02F 2201/38* (2013.01);
(Continued)

(58) Field of Classification Search
CPC ................................................ G02F 1/133504
See application file for complete search history.

(56) References Cited

U.S. PATENT DOCUMENTS

| 6,219,015 B1 | 4/2001 | Bloom et al. |
| 8,177,408 B1 | 5/2012 | Coleman |

(Continued)

FOREIGN PATENT DOCUMENTS

RU   2005129860 A   4/2007

OTHER PUBLICATIONS

U.S. Appl. No. 15/281,381, filed Sep. 30, 2016; Bell et al.
(Continued)

*Primary Examiner* — Edmond C Lau
(74) *Attorney, Agent, or Firm* — Craig A. Baldwin

(57) ABSTRACT

A multi-display system (e.g., a display including multiple display panels) includes at least first and second displays (e.g., display panels or display layers) arranged substantially parallel to each other in order to display three-dimensional (3D) features to a viewer(s). The first and second displays have different color filter patterns, respectively, as viewed from a point of view of a viewer of the display device, in order to reduce moiré interference.

5 Claims, 11 Drawing Sheets
(4 of 11 Drawing Sheet(s) Filed in Color)

Related U.S. Application Data

(60) Provisional application No. 62/363,419, filed on Jul. 18, 2016, provisional application No. 62/281,051, filed on Jan. 20, 2016, provisional application No. 62/236,783, filed on Oct. 2, 2015, provisional application No. 62/239,150, filed on Oct. 8, 2015.

(51) Int. Cl.
| | |
|---|---|
| *G02F 1/1347* | (2006.01) |
| *G09G 3/36* | (2006.01) |
| *H04N 13/395* | (2018.01) |
| *H04N 13/324* | (2018.01) |
| *G02F 1/13363* | (2006.01) |
| *G09G 3/00* | (2006.01) |

(52) U.S. Cl.
CPC ...... *G02F 2201/52* (2013.01); *G02F 2413/01* (2013.01); *G02F 2413/05* (2013.01); *G09G 3/003* (2013.01); *G09G 2300/0452* (2013.01); *G09G 2320/0247* (2013.01)

(56) References Cited

U.S. PATENT DOCUMENTS

| | | |
|---|---|---|
| 2002/0085181 A1 | 7/2002 | Davis et al. |
| 2002/0176037 A1 | 11/2002 | Li |
| 2004/0113875 A1 | 6/2004 | Miller et al. |
| 2004/0183972 A1 | 9/2004 | Bell |
| 2004/0213449 A1 | 10/2004 | Safaee-Rad et al. |
| 2005/0088385 A1 | 4/2005 | Elliott et al. |
| 2006/0203338 A1 | 9/2006 | Pezzaniti |
| 2006/0290594 A1 | 12/2006 | Engel et al. |
| 2007/0064020 A1 | 3/2007 | Credelle et al. |
| 2007/0146579 A1* | 6/2007 | Egi ............... G02F 1/133528 349/96 |
| 2007/0242028 A1 | 10/2007 | Kitagawa et al. |
| 2008/0117231 A1 | 5/2008 | Kimpe |
| 2010/0066654 A1* | 3/2010 | Huang ............. H04N 13/395 345/82 |
| 2011/0188134 A1 | 8/2011 | Bell et al. |
| 2011/0249026 A1 | 10/2011 | Singh |
| 2013/0176725 A1 | 7/2013 | Hajjar et al. |
| 2014/0192275 A1* | 7/2014 | Lee ................ G02F 1/13338 349/12 |
| 2014/0211128 A1 | 7/2014 | Yang et al. |
| 2015/0116555 A1 | 4/2015 | Hayashi |
| 2015/0166555 A1 | 6/2015 | Itov et al. |
| 2015/0323805 A1 | 11/2015 | Bell |
| 2016/0012630 A1 | 1/2016 | Bell |
| 2016/0048052 A1* | 2/2016 | Teng ............... G02F 1/133514 349/61 |

OTHER PUBLICATIONS

U.S. Appl. No. 15/283,525, filed Oct. 3, 2016; Bell et al.
U.S. Appl. No. 15/283,621, filed Oct. 3, 2016; Bell et al.
RU Office Action dated Mar. 13, 2019 for RU Application No. 2018116018.

* cited by examiner

METHODS AND SYSTEM FOR PERFORMING COLOR FILTER OFFSETS IN ORDER TO REDUCE MOIRE INTERFERENCE IN A DISPLAY SYSTEM INCLUDING MULTIPLE DISPLAYS

This application is a Divisional of application Ser. No. 15/281,381, filed Sep. 30, 2016, which claims benefit of Provisional Application Ser. No. 62/363,419, filed Jul. 18, 2016; 62/281,051, filed Jan. 20, 2016; 62/236,783, filed Oct. 2, 2015 and 62/239,150 filed Oct. 8, 2015, the entire contents of which are incorporated herein by reference.

FIELD OF THE INVENTION

This invention relates to a multi-display system (e.g., a display including multiple display panels), where at least first and second displays (e.g., display panels or display layers) are arranged substantially parallel to each other in order to display three-dimensional (3D) features to a viewer(s). Thus, this invention relates generally to displays and, more particularly, to display systems and methods for displaying three-dimensional features.

BACKGROUND AND SUMMARY OF THE INVENTION

Traditionally, displays present information in two dimensions. Images displayed by such displays are planar images that lack depth information. Because people observe the world in three-dimensions, there have been efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

Multi-component displays including multiple display screens in a stacked arrangement have been developed to display real depth. Each display screen may display its own image to provide visual depth due to the physical displacement of the display screens. For example, multi-display systems are disclosed in U.S. Patent Publication Nos. 2015/0323805 and 2016/0012630, the disclosures of which are both hereby incorporated herein by reference.

When a first and second displays or display layers are conventionally stacked on each other in a multi-display system, moire interference occurs. The moire interference is caused by interactions between the color filters within the layers when projected onto the viewer's retina. For example, when green color filters overlap, light is transmitted making for a comparative bright patch. When a green filter is over say a red filter, not as much light will be transmitted making for a dark region. Since the rear and front displays or display layers have slightly different sizes when projected onto the retina, the pixels will slowly change from being in phase to out of phase. This has the effect of producing dark and bright bands otherwise known as moire interference.

There have been several approaches to removing moire interference in a multi-layer display (MLD) system. Some approaches rely on removing unwanted frequency components by spatial filtering. This can be accomplished with either a diffuser type system whereby an element with a refractive index of about 1.5 has random surface perturbations, or a diffraction type system. The performance of these systems in terms of visual aesthetics (e.g., how blurry the image looks; how much residual moire is left; the effect on polarization; and cost, etc.) depend greatly on the system configuration. Certain MLD systems solely utilize diffusive optics to blur the rear-most display layer. This approach suffers from the following limitations: (a) the rear most image is inherently blurry—there is a trade-off between reducing moire interference and the clarity of the rear most image display layer; (b) the diffusing element utilizes a specialized diffuser pattern, which is difficult to obtain; (c) the diffusing element sits between polarizers and both the film substrate and stiffener substrate must be free of any birefringence; and (d) the diffusing element requires a separate stiffener component (usually glass) which adds weight and expense to the final display system. As a result, MLD systems using solely a diffuser to address moire issues do not provide an ideal solution to reducing moire interference, especially as those systems have reduced form factors.

Historic and present methodologies that rely only on diffusers to address moire interference do not provide an acceptable solution to the moiré issue without the introduction of significant and detrimental side-effects to image quality.

Certain example embodiments of the instant invention provide solution(s) that make moiré interference in MLD systems vanish or substantially vanish, but without significantly sacrificing the rear display resolution and contrast. In certain example embodiments of this invention, the MLD system includes first and second displays. Color filters of the first display are offset and/or differently arranged compared to color filters of the second display, in order to reduce or eliminate moire interference. In certain embodiments of this invention, color filters of the first display are arranged in a dissimilar manner compared to color filters of the second display, in order to reduce or eliminate moire interference. Dissimilar color filter arrangements according to this invention, on different displays of a MLD system, may or may not be used in combination with other moire reducing techniques (e.g., diffuser(s) and/or refractive element(s)) according to various embodiments of this invention.

In certain example embodiments of this invention, there is provided a display device comprising: a first display in a first plane for displaying a first image; a second display in a second plane for displaying a second image, wherein said first and second planes are approximately parallel to each other; and wherein the first and second displays have different color filter patterns, respectively, as viewed from a point of view of a viewer of the display device, in order to reduce moiré interference.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

Figure 1:
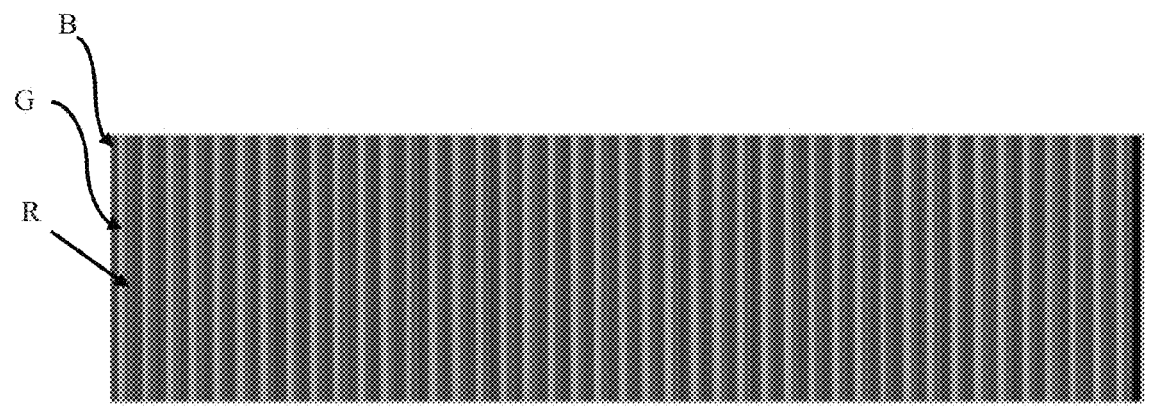
FIG. 1 is a top plan view of color filters of a liquid crystal display (LCD) where pixels are the same color in each column.

This invention relates to a multi-display system (e.g., a display including multiple display panels), where at least first and second displays (e.g., display panels or display layers) are arranged substantially parallel to each other in order to display three-dimensional (3D) features to a viewer(s). The displays may be flat or curved in different embodiments. Thus, embodiments of this invention relate generally to displays and, more particularly, to display systems and methods for displaying three-dimensional features. MLDs according to example embodiments of this invention may be used, for example, as displays in vehicle dashes in order to provide 3D images (e.g., for speedometers, vehicle gauges, vehicle navigation displays, etc.).

The color moiré interference problem is caused by the pattern regularity of both LCD color filter arrays as the RGB pixels are aligned into RGB columns. Color moiré interference is largely prevalent in the horizontal direction.

Certain example embodiments of the instant invention provide solution(s) that make moiré interference in MLD systems vanish or substantially vanish, but without significantly sacrificing the rear display resolution and contrast. In certain example embodiments of this invention, the MLD system includes at least first and second displays that are provided in a stacked relationship so as to be located on different respective planes that are parallel or substantially parallel to each other. Color filters of the first display are offset and/or differently arranged compared to color filters of the second display, in order to reduce or eliminate moire interference. In certain embodiments of this invention, color filters of the first display are arranged in a dissimilar manner compared to color filters of the second display, in order to reduce or eliminate moire interference. It is possible to construct dissimilar pixel patterns on one display, compared to the other display(s) of the MLD, to reduce or prevent moiré interference in the MLD. For example, changing the size and/or arrangement of the pixel structure on one display relative to the other display can render the moire interference pitch either so large or small that it is substantially invisible. In the case that a monochrome display can be utilized as a back screen, having thin trace lines that are oriented at approximately forty-five degrees on one display (and horizontally or vertically on the other display) significantly or completely eliminates the interference. Thus, according to embodiments of the present disclosure, systems and methods are described providing for the elimination and/or reduction of moiré interference in a multiple layered display through color filtering/area dithering or other color filter/area dissimilarities.

In other words, when viewed from above or from the point of view of the viewer of a MLD system, the overlapping pixel/color filter patterns from the first and second displays are different in order to reduce or eliminate moire interference. Dissimilar color filter arrangements according to this invention, on different displays of a MLD system, may or may not be used in combination with other moire reducing techniques (e.g., diffuser(s) and/or refractive element(s)) according to various embodiments of this invention.

In example embodiments of this invention, there is potential to eliminate this moiré effect by the customization of the color filter array. FIGS. 1-6 illustrate a simulation with MATLAB showing the mixing of two LCD panels, where all pixels are plain white when viewed from a distance.

Figure 2:
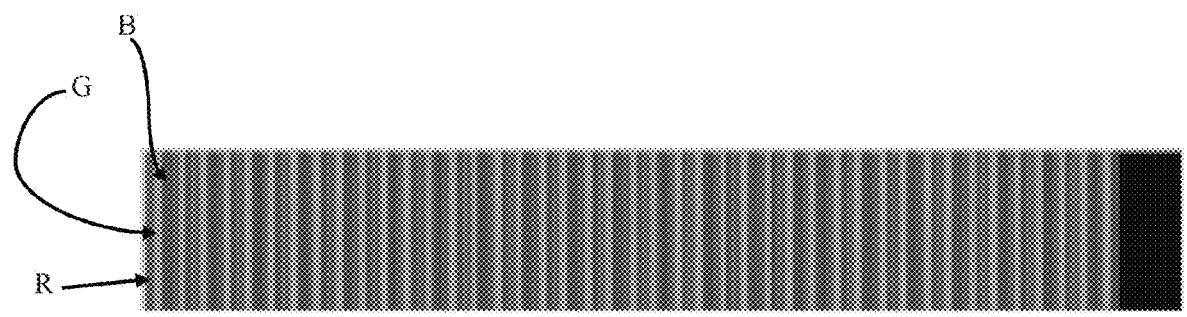
FIG. 2 is a top plan view of color filters of another liquid crystal display (LCD) where pixels are the same color in each column.
Figure 3:
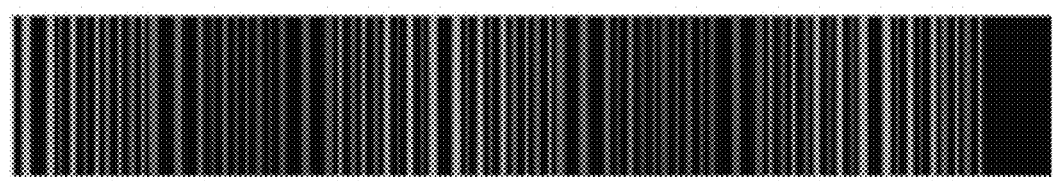
FIG. 3 is a top plan view of a MLD system resulting from the combination of LCDs of FIGS. 1 and 2 where the LCD of FIGS. 1 and 2 are overlapped with each other in a stacked relationship, which results in moire interference.

FIGS. 1-3 illustrate an arrangement in a MLD system which experiences moire interference.

FIG. 1 is a top plan view of color filters/pixels of a first liquid crystal display (LCD) where pixels are the same color in each column. In particular, FIG. 1 shows a LCD having a conventional red-green-blue (R-G-B) repeating pattern or arrangement, wherein the pixels are the same color in each column. Starting from the left side of FIG. 1, the color filter stripes are arranged in vertical lines in a BGR order, and this order repeats itself over and over moving from left to right across FIG. 1. Thus, the pattern in the display or display layer of FIG. 1 includes blue columns, green columns, and red columns. The green (G) columns are located between blue (B) and red (R) colored columns. FIG. 1 is shown without color mask rotation. Conventionally, both panels of a multiple layered display (MLD) may be configured similarly with such a R-G-B arrangement. The repeatable pattern may be R-G-B, or R-B-G, or any other combination.

Likewise, FIG. 2 is a top plan view of color filters/pixels of a second LCD where pixels are also the same color in each column. Starting from the left side of FIG. 2, the color filter stripes are arranged in vertical lines in a RGB order, and this order repeats itself over and over moving from left to right across FIG. 2. The repeatable pattern may be R-G-B, or R-B-G, or any other combination involving these colors. As shown in FIG. 2, like in FIG. 1, green (G) columns are located between blue (B) and red (R) colored columns. FIG. 3 is a top plan view of a MLD system resulting from the combination of the LCDs of FIGS. 1 and 2, one on top of the other in a stacked relationship.

FIG. 3 shows the mixing of the patterns shown in FIGS. 1 and 2. In particular, FIG. 3 illustrates the emergence of moiré interference given an instance wherein both LCDs have a similar R-G-B column arrangement, where the pixels are the same color in each column. For example, when the FIG. 2 pattern overlaps the FIG. 1 pattern in a MLD system, the green color filter lines overlap (e.g., see the left portion of FIG. 3), and light in this green filter line overlap area is transmitted through the MLD system making for a comparative bright green patch. When a green filter overlaps a red filter for instance (or a blue filter is over a red filter), not as much light will be transmitted making for a dark region (e.g., see the dark regions surrounding the green strip at the far left side of FIG. 3). Since the rear and front displays or display layers have slightly different sizes when projected onto the retina, the pixels will slowly change from being in phase to out of phase. This has the effect of producing dark and bright bands otherwise known as moire interference.

Embodiments of this invention address and solve this problem by providing a MLD system where first and second displays provided in a stacked relationship on different planes have different color filter and/or pixel patterns in order to reduce or eliminate moire interference.

Figures 4A, 4B:
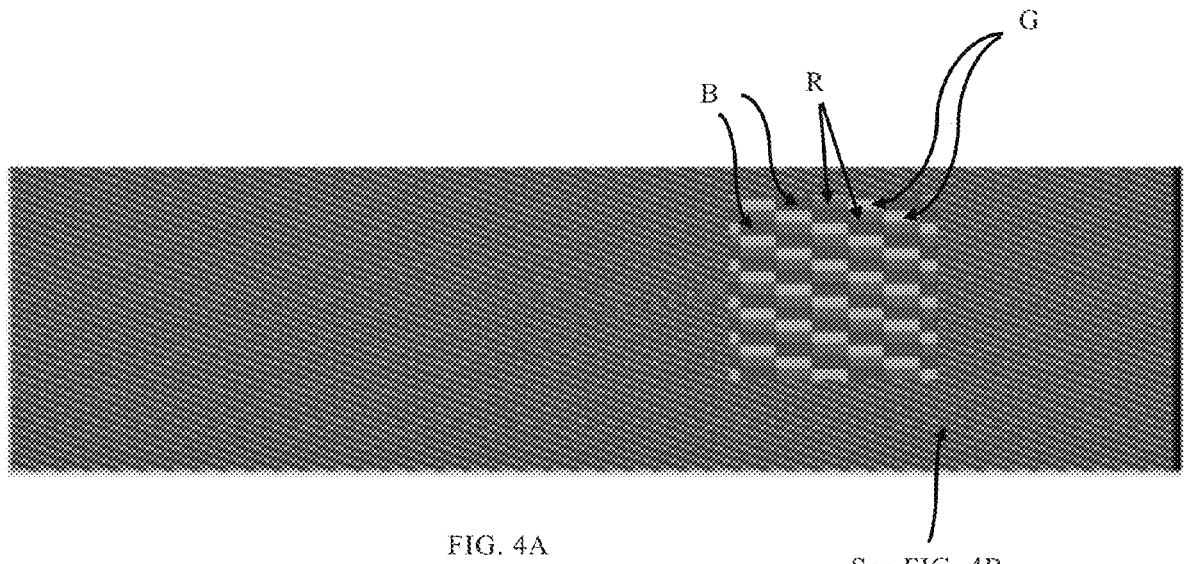
FIG. 4A is a top plan view, including a magnified portion, illustrating an LCD including color filters arranged in a color mask rotation pattern.
FIG. 4B is a schematic view illustrating the color filter pattern of the LCD of FIG. 4A.
Figure 5:
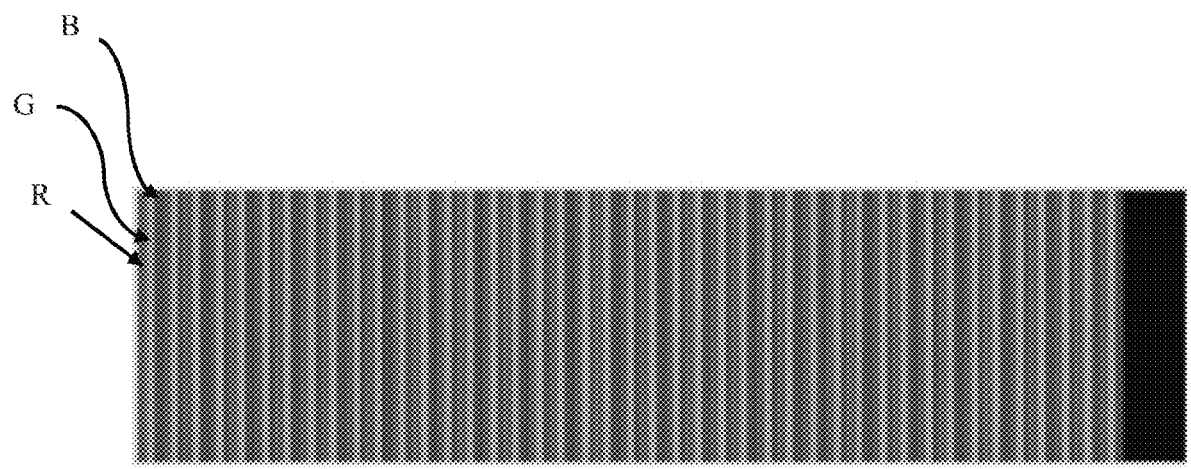
FIG. 5 is a top plan view of color filters of a LCD where pixels are the same color in each column.
Figure 6:
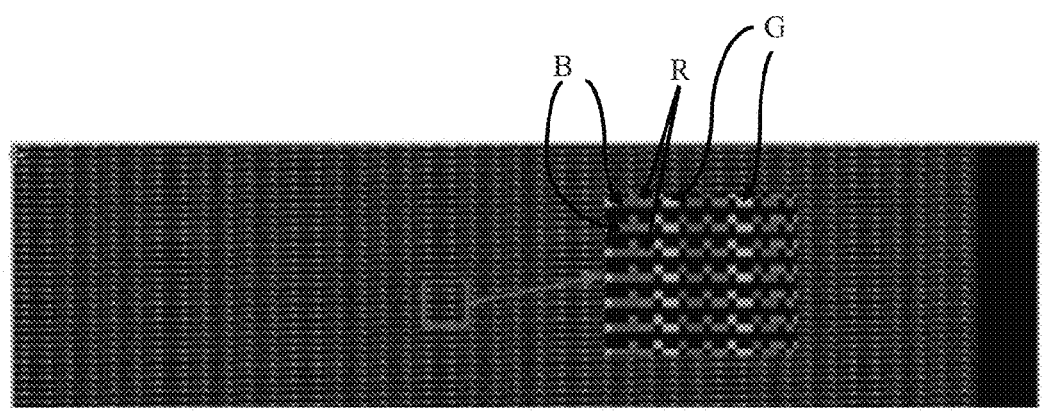
FIG. 6 is a top plan view of a MLD system including the LCDs of FIGS. 4 and 5 stacked on each other, in order to reduce or substantially eliminate moire interference according to an example embodiment of this invention.

FIGS. 4-6 illustrate an embodiment of this invention where moiré interference will be comparatively reduced or disappear (compared to FIG. 3), and where the color will be approximately white (e.g., gray) when seen from a distance.

FIG. 4A illustrates a first LCD of a MLD with color mask rotation. A pixel area is highlighted in FIG. 4A, and illustrates R-G-B blocks repeated in both row and column directions. As shown, instead of arranging the red, green, and blue filters in a vertical stripe pattern as in FIGS. 1-2, the sub-pixels are rotated, and then dithered by offsetting by one pixel for each row in FIG. 4A. FIG. 4B is a schematic illustration of the pixel area highlighted in FIG. 4A, rotated and dithered. As shown, red, green, and blue step-down stripes are angled, such that they are between a vertical and horizontal orientation. For example, the red stripe steps down from the upper left to the lower right. This is similar for the blue and green stripes. In other words, red, green and blue colored stripes are each arranged diagonally from the upper left to the lower right in the display of FIGS. 4A-4B, but not in the vertical direction, horizontal direction, or the lower-left to upper-right direction. The display of FIGS. 4A-4B is to be combined with the display of FIG. 5 in a MLD system according to an example embodiment of this invention, in an overlapping manner in the MLD.

FIG. 5 illustrates an LCD panel in a R-G-B vertical line arrangement. The red, green, and blue color filter lines in FIG. 5 are shown arranged in the vertical direction, but alternatively may be arranged in the horizontal direction. Starting from the left side of FIG. 5, the color filter stripes are arranged in vertical lines in a RGB order, and this order repeats itself over and over moving from left to right across FIG. 5. Importantly, the color filter arrangement of the FIG. 5 LCD is different than that of the FIG. 4 LCD. The FIG. 5 LCD has its color filter colors arranged in vertical color stripes, whereas the FIG. 4 LCD has its color filter colors arranged in diagonal color stripes. The FIG. 5 repeatable pattern may be R-G-B, or R-B-G, or any other combination.

The display shown in FIG. 4 can be mixed with the display shown in FIG. 5 in order to reduce or eliminate moire interference. FIG. 6 is a top plan view of a MLD system including the LCDs of FIGS. 4 and 5 stacked on each other in an overlapping manner, in order to reduce or substantially eliminate moire interference according to an example embodiment of this invention. FIG. 6 shows the mixing of the overlapping patterns of FIGS. 4 and 5. The FIG. 4 pattern with diagonally colored stripes overlaps the FIG. 5 pattern with vertically colored stripes. For instance, the FIG. 4 LCD may be the display layer 1 shown in MLD of FIG. 16, and the FIG. 5 LCD may be the display layer 2 in the MLD of FIG. 16 (or vice versa). As shown, moiré interference has been reduced or disappeared, and the color of the FIG. 6 MLD will be white (e.g., bright gray) when viewed from a distance. For example, in the highlighted block of FIG. 6, individual columns of R-G-B appear in a repeatable consistent pattern.

In another example embodiment of this invention, a beam mapping element such as diffractive optical element (DOE) or a refractive beam mapper (RBM) composed of many micro-lenses may be placed anywhere within the region comprising the top surface of the rear LCD and including above the top surface of the front LCD to reduce/eliminate moiré interference. This technique may be used in combination with any other embodiment of this invention described herein. Each of the refractive micro-lenses is designed to direct incident rays from the back LCD to an observer in a defined path, each ray passing through a different sub-pixel in the front LCD according to a pseudo random mapping. The pseudo random mapping is provided in order not to introduce extra moiré effects. The divergence of these individual beams is limited so that any point on the rear LCD is not diverted more than one pixel distance from a straight line. The ideal solution is to laminate the element to the top LCD and optically match the media between the two LCDs with a non-birefringent material. However, the refractive beam mapper can be placed anywhere within the LCD stack.

In another embodiment, it is possible to use a method of sub-pixel compression to construct a multilayer optical element that turns or compresses the red and blue sub-pixels onto the green sub-pixel to reduce/eliminate moiré interference. This changes the rear color filter pattern into a single white strip, which removes color filter interaction between display layers. Again, this technique may be used in combination with any other embodiment of this invention described herein. In another embodiment, a refractive beam mapper can be combined with this color compressor. The combination of compression and expansion effectively removes color structure from the rear LCD without reducing resolution. This provides another solution for moiré elimination.

Other example embodiments of this invention are illustrated in connection with FIGS. 7-15. It is noted that the displays of FIG. 15 include white (W) colored pixels, in addition to red (R), green (G) and blue (B) colored pixels. Cyan pixel are also possible. The color filter/pixel pattern of any of the displays shown in any of FIGS. 7-15 may be used as the first display (rear or front) of a MLD system along with the color filter/pixel pattern of any of the other displays shown in any of FIGS. 1-15 as the second display (the other of rear or front) of a MLD system, according to example embodiments of this invention. For example, the LCD of FIG. 9 may be the first display (e.g., display layer 1 in FIG. 16), overlapping the second display which has a color filter/pixel pattern as shown in any of FIG. 1-2, 4, 5, 7-8, 10-12, or 14-15 (e.g., display layer 2 in FIG. 16), in a MLD according to an example embodiment of this invention. As another example, the LCD of FIG. 10 may be the first display (e.g., display layer 1 in FIG. 16), overlapping the second display which has a color filter/pixel pattern as shown in any of FIG. 1-2, 4, 5, 7-9, 11-12 or 14-15 (e.g., display layer 2 in FIG. 16), in a MLD according to an example embodiment of this invention. As another example, the LCD of FIG. 11 may be the first display (e.g., display layer 1 in FIG. 16), overlapping the second display which has a color filter/pixel pattern as shown in any of FIG. 1-2, 4, 5, 7-10, 12 or 14-15 (e.g., display layer 2 in FIG. 16), in a MLD according to an example embodiment of this invention. As another example, the LCD of FIG. 12 may be the first display (e.g., display layer 1 in FIG. 16), overlapping the second display which has a color filter/pixel pattern as shown in any of FIG. 1-2, 4, 5, 7-11 or 14-15 (e.g., display layer 2 in FIG. 16), in a MLD according to an example embodiment of this invention. As another example, the LCD on the left side of FIG. 14 may be the first display (e.g., display layer 1 in FIG. 16), overlapping the second display which has a color filter/pixel pattern as shown in any of FIGS. 1-2, 4, 5, 7-12, or the right side of FIG. 14 (e.g., display layer 2 in FIG. 16), in a MLD according to an example embodiment of this invention. As another example, the LCD on the left side of FIG. 15 may be the first display (e.g., display layer 1 in FIG. 16), overlapping the second display which has a color filter/pixel pattern as shown in any of FIGS. 1-2, 4, 5, 7-12, or the right side of FIG. 15 (e.g., display layer 2 in FIG. 16), in a MLD according to an example embodiment of this invention. The use of such dissimilar color filter/pixel patterns in the different displays (e.g, LCDs, OLEDs, etc.) of the MLD function to reduce or eliminate moire interference in the MLD for the reasons explained herein.

Figure 7:
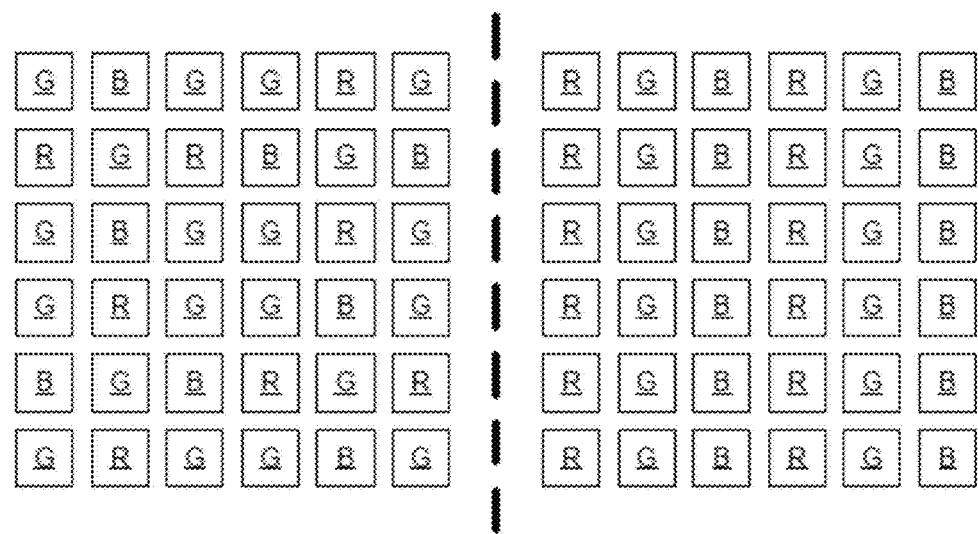
FIG. 7 illustrates dissimilar color filter/pixel patterns on front and rear LCDs of a MLD system, respectively, in order to reduce or substantially eliminate moire interference according to an example embodiment of this invention (the left side of FIG. 7 illustrates the color filter/pixel pattern of one of the displays, and the right side of FIG. 7 illustrates the color filter/pixel pattern of the other one of the displays of the MLD system)
Figure 16:
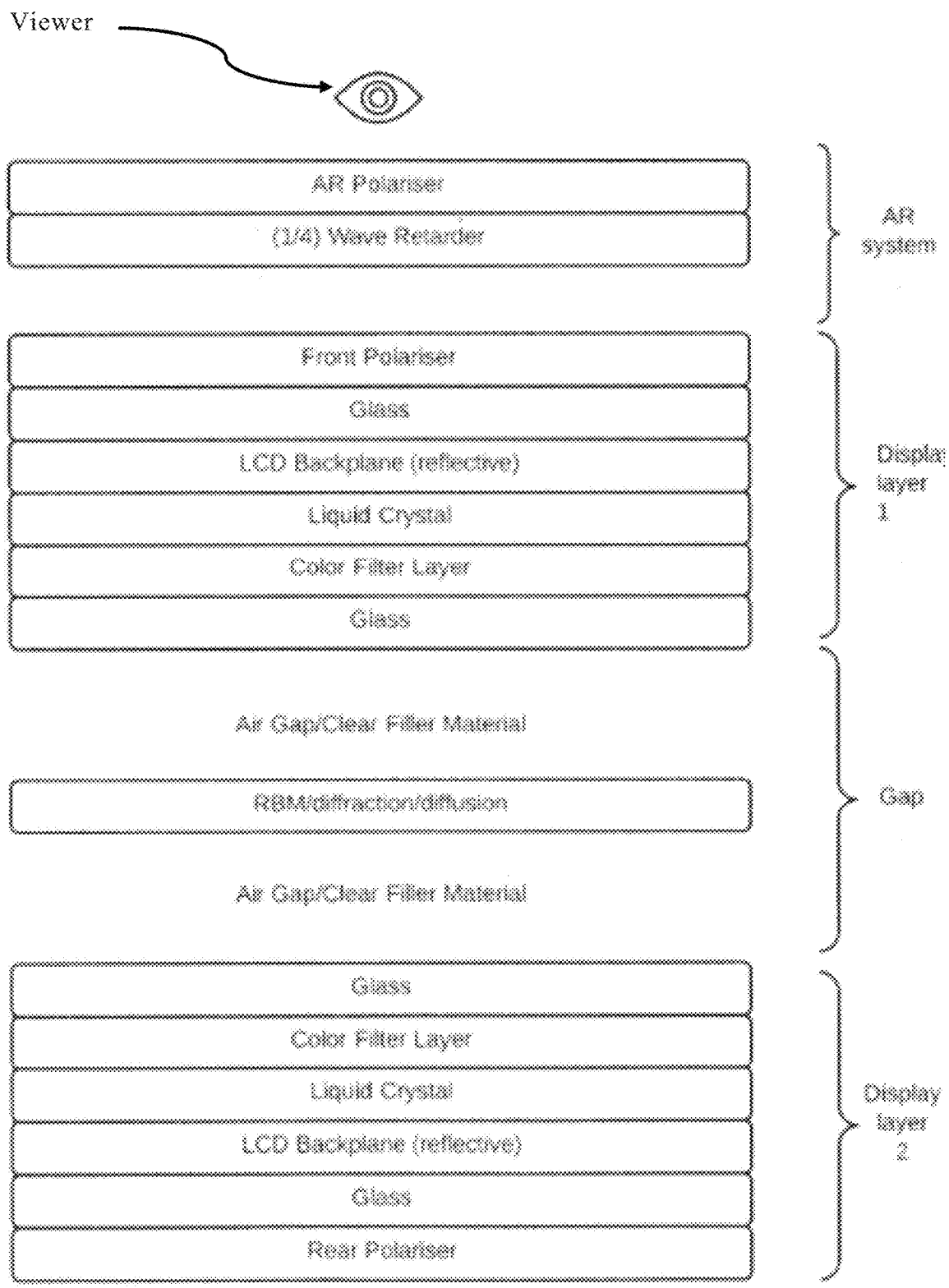
FIG. 16 is a schematic side cross sectional view of a MLD according to an example embodiment of this invention, which may be used with the embodiments of any of FIGS. 4-15.

FIG. 7 illustrates a pixel/color filter pattern of a first display (rear or front) on the left side of the figure, and the different pixel/color filter pattern of the second display (the other of rear or front) on the right side of the figure, of a MLD. Thus, FIG. 7 illustrates dissimilar pixel patterns for front and rear displays of a MLD that may be used with each other so as to overlap in a stacked manner as shown in FIG. 16. As shown in FIG. 7, a sub-randomized pattern is shown on the left hand side, and a striped pattern is shown on the right hand side. In one example embodiment, no two rows or columns in the pattern on the left hand side are the same in a given area. The pattern for the display (e.g., LCD) on the left side of FIG. 7 has, among other things, green colored filter lines oriented diagonally from upper-left to lower-right, and blue and red pixels/filter oriented in triangular patterns throughout the display. Meanwhile, the pattern for the display (e.g., LCD) on the right side of FIG. 7 has red, green, and blue colored filter lines oriented in the vertical direction (alternatively, they could be arranged in the horizontal direction), such that it is very different than the pattern on the left side of FIG. 7. One of the displays in FIG. 7 is the front display (e.g., display layer 1 in FIG. 16), and the other of the displays in FIG. 7 is the rear display (e.g., display layer 2 in FIG. 16) according to an example embodiment of this invention. Since there is no local regular pattern on the rear most display to interfere with the pixels on the front display, substantially no moire interference is formed. As such, combining dissimilar pixel patterns according to the FIG. 7 embodiment avoids or reduces moiré interference. When two same-direction stripe patterns are combined, moiré interference is formed between the layers. However, when the randomized pattern and striped pattern of FIG. 7 are combined as the displays or display layers of an MLD, any large scale moire interference is reduce or eliminated.

In one example embodiment, the MLD as a whole contains colored sub-pixel stripes. If the colored stripes (i.e., not just the sub-pixels themselves) are rotated (e.g., by 45 degrees, 30 degrees, 60 degrees, etc.), then the interference is eliminated. In certain example embodiments, colored stripes of the first display may be angled from about 30-90 degrees from colored stripes of the second display of a MLD in order to reduce or eliminate moire interference in example embodiments of this invention.

Displays or display layers herein may be LCDs, OLEDs, or the like. Twisted nematic (TN) LCDs may follow a fairly generic pixel layout, such as a square divided into three portions running horizontally with red green and blue sub-pixels. The sub-pixels may be separated by a black mask in the horizontal and vertical directions. There is often a square protrusion in the corner of the sub-pixel to cover the drive transistor. There are several different types of pixel technology that enable wide screen viewing and temporal performance required for modern desktop monitors and televisions. Embodiments of the present invention are compatible with all of these LCDs, since the backplanes are designed to follow the basic RGB stripe pixel layout. As such, the backplane layout required for each pixel not need to change, only the color filter mask layout. For example, pixel types by manufacturer are: Panasonic (IPS Pro), LG Display (H-IPS & P-IPS), Hannstart (S-IPS), AU Optronics (A-MVA), Samsung (AFFS), S-LCD (S-PVA), and Sharp Corporation (ASV and MVA). IPS type LCDs, or other LCD types, may also be used. In certain embodiments, both displays or display layers may be OLEDs, or one display may be an OLED and the other an LCD. Note that in OLEDs, respective sub-pixels or pixels would be filled with red, green, and blue material (as opposed to having colored filters).

In certain example embodiments, one embodiment, pixel rotation of +90 or −90 may be provided. This may for example correspond to portrait mode, which for example, is used in smartphones. In this configuration, the gate lines may run vertically, and row address lines may run horizontally. As shown in FIG. 8, configurations include a B, G, R configuration, and an R, G, B configuration, as used in an IPS LCD panel (e.g., top elements). Since the black matrix between the pixels would remain, the application of a diffractive beam splitting element or a refractive beam mapping element, or diffuser may be used in example embodiments. A vertical line pattern is shown in the middle of the pixel (e.g., top elements). As shown in the bottom elements of FIG. 8, the pixel design may be altered such that there are more of these lines (e.g., auxiliary capacitance lines) in the vertical direction to reduce the copying or remapping distance required. Hence, contrast reduction is achieved. This may be implemented using a diffractive beam splitting element, or a refractive beam mapping element, or diffusers. In one embodiment, the elements would be optimized to minimize reduction in contrast for black pixels.

Figure 8A:
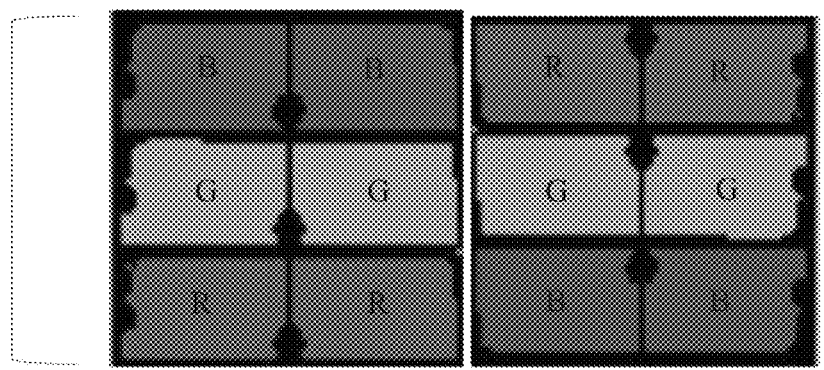
FIGS. 8A-8B illustrate dissimilar color filter/pixel patterns on front and rear LCDs of a MLD system in order to reduce or substantially eliminate moire interference according to other example embodiments of this invention (any of the four color filter/pixel patterns in FIGS. 8A-8B may be used in combination with any of the other color filter/pixel patterns in FIGS. 8A-8B in different embodiments of this invention)
Figure 8B:
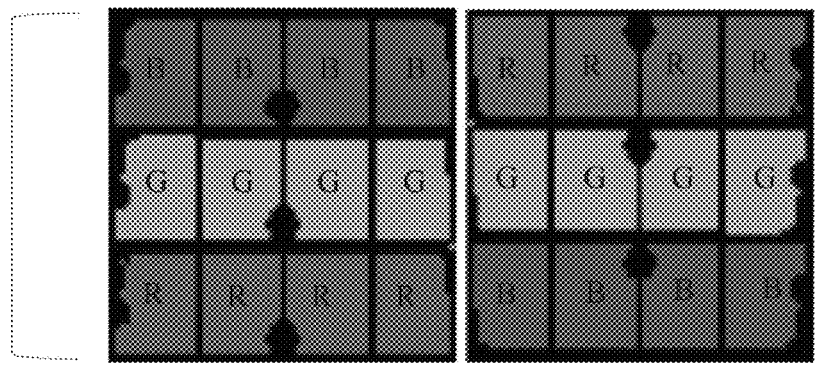

FIGS. 8A-8B illustrate dissimilar color filter/pixel patterns on front and rear LCDs of a MLD system in order to reduce or substantially eliminate moire interference according to other example embodiments of this invention. The color filter patterns shown in FIGS. 8A-8B (applicable to LCD or OLEDs, as the other embodiments herein) may be used either in the front or rear display of a MLD, or in both. Any of the four color filter/pixel patterns in FIGS. 8A-8B may be used in combination with any of the other color filter/pixel patterns in FIGS. 8A-8B in different embodiments of this invention, for example (e.g., one in display 1 in FIG. 16, and the other in display 2 of the MLD in FIG. 16).

Figure 9:
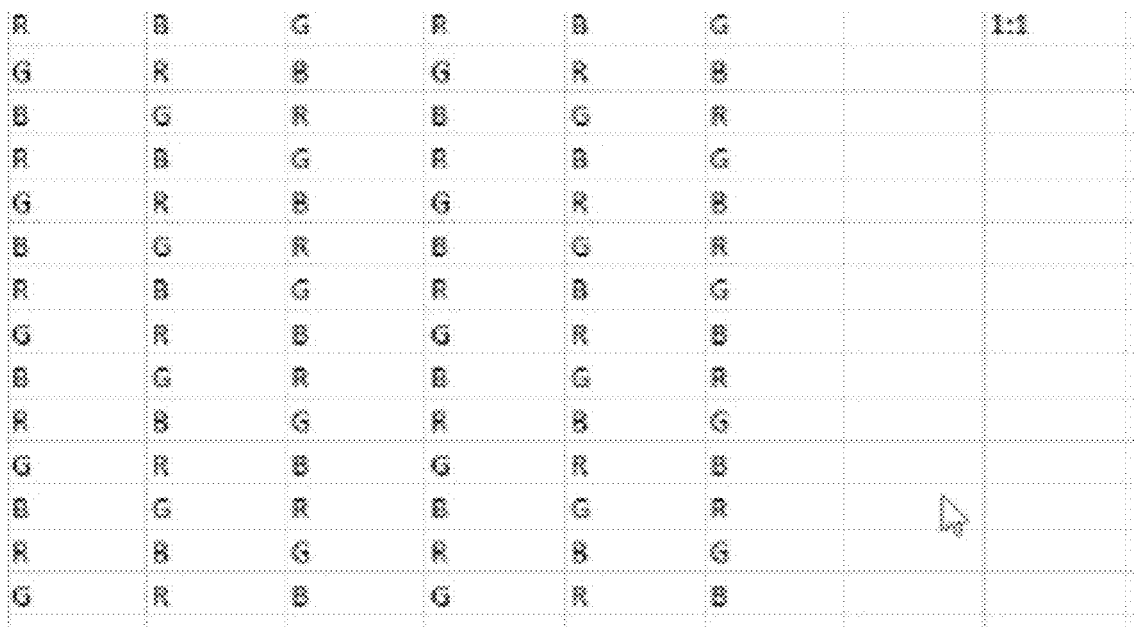
FIG. 9 is a top view of a color filter/pixel pattern where color filters may be dithered in a 1:1 step configuration according to an example embodiment of this invention.
Figure 10:
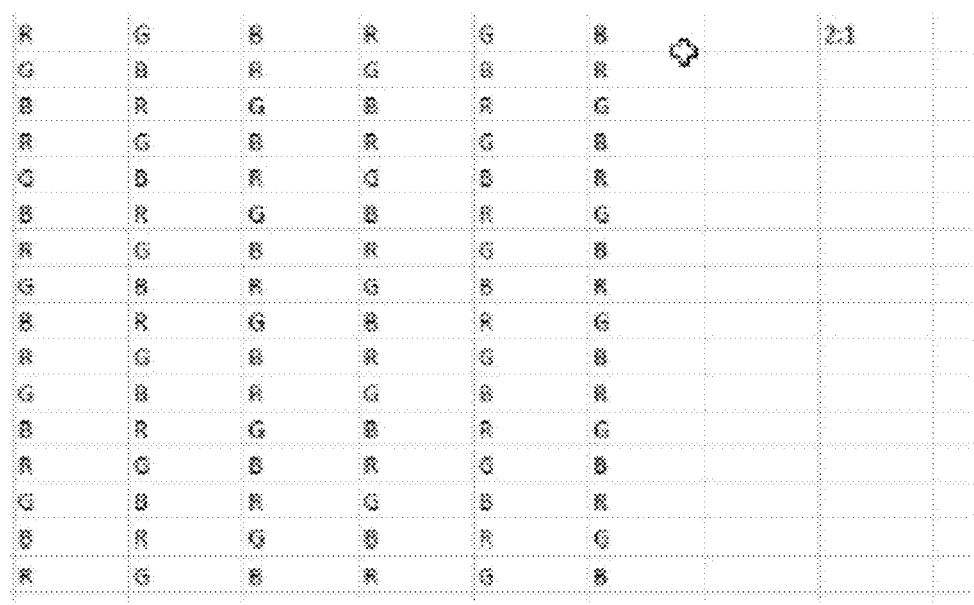
FIG. 10 is a top view of a color filter/pixel pattern where color filters may be dithered in a 2:1 step configuration according to an example embodiment of this invention.
Figure 11:
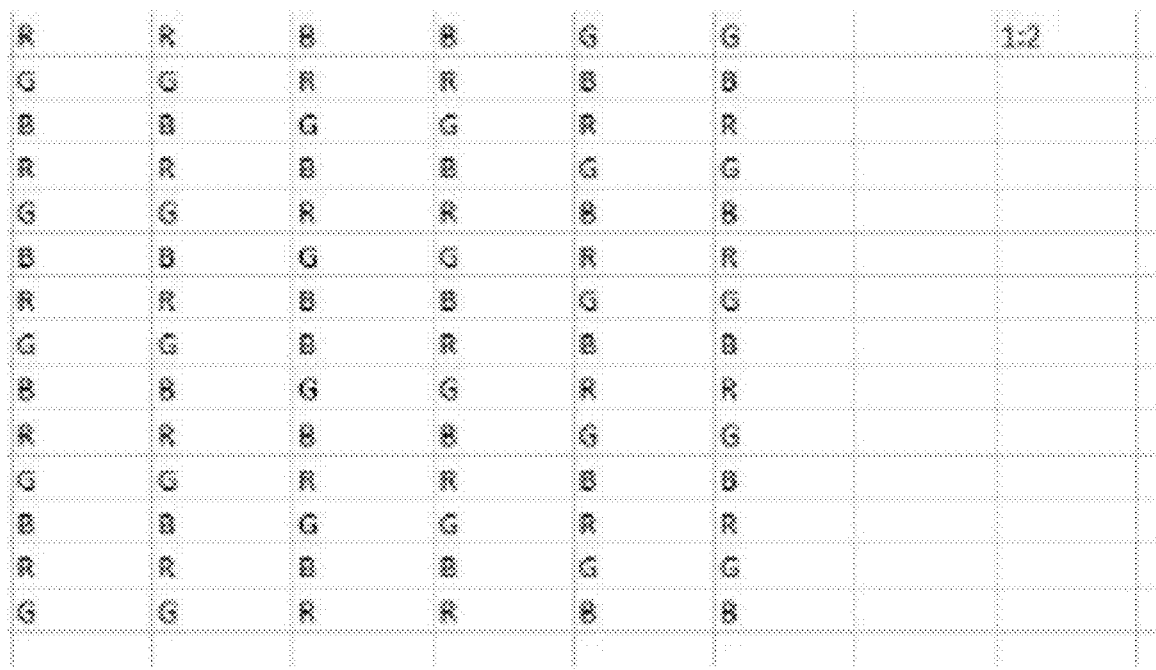
FIG. 11 is a top view of a color filter/pixel pattern where color filters may be dithered in a 1:2 step configuration according to an example embodiment of this invention.
Figure 12:
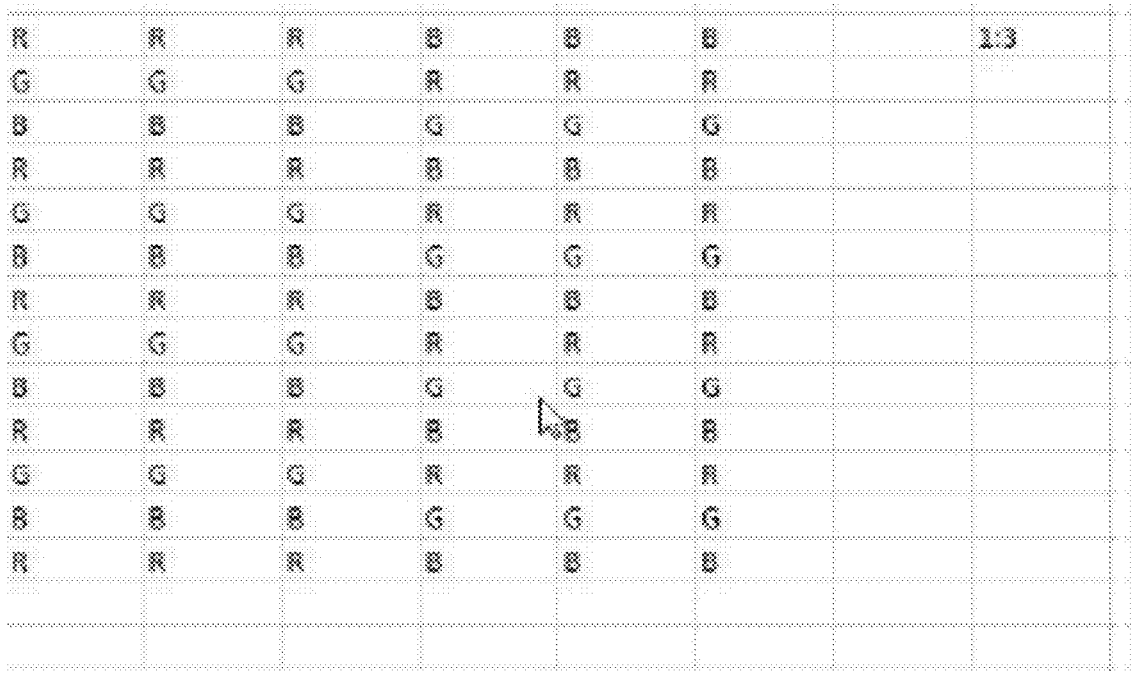
FIG. 12 is a top view of a color filter/pixel pattern where color filters may be dithered in a 1:3 step configuration according to an example embodiment of this invention.

FIG. 9 shows a configuration, wherein color filters of one or both of the overlapping/stacked displays (LCD or OLED) in a MLD may be dithered in a 1:1 step configuration, in accordance with an example embodiment of this invention. Red, blue and green colored lines in FIG. 9 run from upper-left to lower-right of the display as viewed from above (or below). FIG. 10 shows a configuration, wherein color filters of one or both of the overlapping/stacked displays (LCD or OLED) in a MLD may be dithered in a 2:1 step configuration, in accordance with an embodiment of this invention. In FIG. 10, a red color filter/area for example drops down two rows when it moves over one column to the right (2:1). The same applies to green and blue colored filters/areas in FIG. 10. FIG. 11 shows a configuration, wherein color filters of one or both of the overlapping/stacked displays (LCD or OLED) in a MLD may be dithered in a 1:2 step configuration, in accordance with an example embodiment of this invention. In FIG. 11, a given row includes two blue filters, then two green filters, then two red filters (in any color order), then a repeat, and the colored pairs move a column set to the right when dropping down a row. FIG. 12 shows a configuration, wherein color filters of one or both of the overlapping/stacked displays (LCD or OLED) in a MLD may be dithered in a 1:3 step configuration, in accordance with an example embodiment of this invention. In FIG. 12, a given row includes three blue filters, then three green filters, then three red filters (in any color order), then a repeat, and the colored pairs move a column set to the right when dropping down a row. The dithering layout may be constructed by changing the mask art for the red, green, and blue filters in the patterns described above. For example, the FIG. 9 pattern above can be used with any of the FIG. 10-12 patterns (one for the front display panel and the other for the rear display panel of the MLD), in order to reduce moiré interference as discussed herein. As another option, any of the FIG. 9-12 patterns can be used with any other of the FIG. 9-12 patterns (one for the front display panel and the other for the rear display panel of the MLD), in order to reduce moiré interference as discussed herein. As another example, the FIG. 9 pattern above can be used with any of the other patterns herein (one for the front display panel and the other for the rear display panel of the MLD), in order to reduce moiré interference as discussed herein. Any of the FIG. 9-12 patterns can be used with any of the other patterns herein (one for the front display panel and the other for the rear display panel of the MLD), in order to reduce moiré interference as discussed herein.

Figure 13:
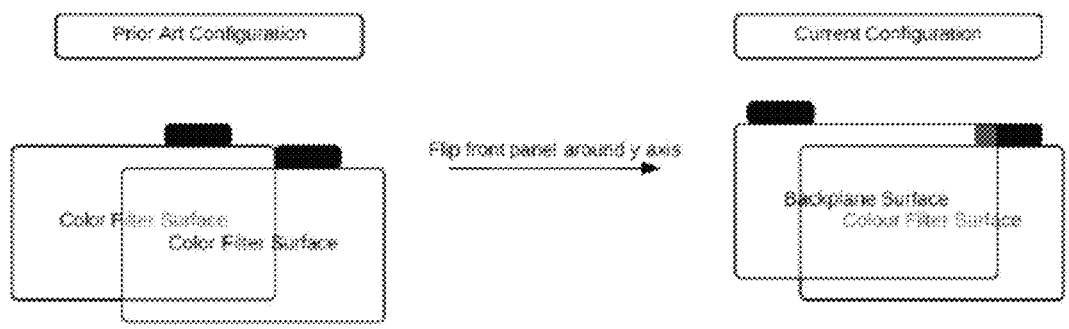
FIG. 13 is a schematic diagram illustrating how the first and second displays may be arranged relative to one another according to an example embodiment of this invention (this may or may not be used in conjunction with the embodiments shown in FIG. 4-12 or 14-15)

In certain example embodiments, one display panel of the MLD is created with subpixels in an offset configuration, where the offset may be variable, and then this is re-used on the other panel (e.g., back panel) by flipping it by about 180 degrees about the x or y axis. Such may be used where the subpixels have Red-Green-Blue, or Red-Green-Blue-White configuration(s) for example and without limitation. See for example the right side of FIG. 13. For example, the left side of FIG. 13 illustrates a conventional MLD where the same color filter pattern is used for both display of a MLD and the color filter layer of both displays is arranged to face the viewer, which produces moire interference. In other to reduce such moire interference, in certain example embodiments of this invention the front panel may be flipped about the x or y axis so that when viewed from the point of view of the viewer of the MLD the front and rear panels have different pixel/colored filter patterns.

Figure 14:
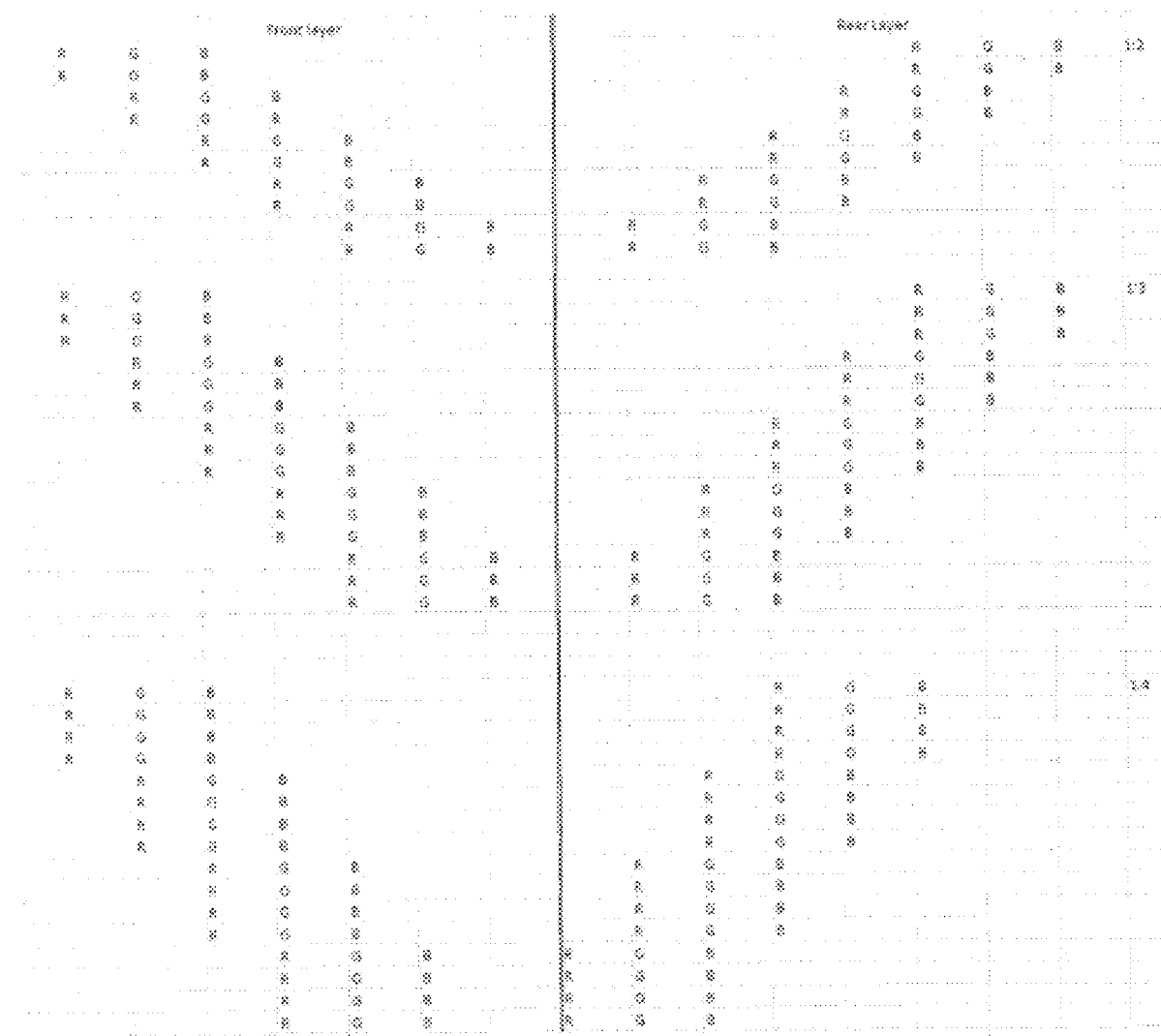
FIG. 14 is a top view of the color filter/pixel patterns of the front and rear displays, which are different from each other, according to another example embodiment of this invention (the pattern of the front display being on the left side of FIG. 14, and the pattern of the rear display being on the right side of FIG. 14)

FIG. 14 illustrates another example embodiment of this invention. The pixel/color filter pattern of a first display is shown on the left side of FIG. 14, and the pixel/color filter pattern of the other display of a MLD is shown on the right side of FIG. 14. The LCD on the left side of FIG. 14 may be one of the displays or display layers in the MLD of FIG. 16, and the LCD on the right side of FIG. 14 may be the other of the displays or display layers in the MLD of FIG. 16. The illustrated front layer would be overlaid over the illustrated rear layer, as viewed from the point of view of the viewer of the display. In particular, the left-most column of the "front layer" would overlap the left-most column of the "rear layer," and/or the right-most column of the front layer would overlap the right-most column of the rear layer. In the left side pattern (e.g., front display or front display layer 1), colored filter/area lines are oriented from the upper left to the lower right with respect to R, G and B colors. On the other hand, in the right side pattern (e.g., rear display or rear display layer 2) of FIG. 14, colored filter/area lines are oriented from the upper right to the lower left with respect to R, G and B colors. Thus, the colored lines formed by the color filters/areas in the different display panels are angled from each other by approximately 45-120 degrees at least in some instances. FIG. 14 illustrates three dithered RGB sub-pixel configurations on the front layer (left column in the figure) and rear layer (right column in the figure) when looking down at the display from the point of view of the viewer of the MLD stack. It can be seen that when the front and rear layers 1 and 2 are superimposed in an overlapped manner (e.g., see FIG. 16), the stripe patterns formed in the diagonal directions do not form large banded intersection regions and therefore the appearance of moire interference is reduced or minimized.

Figure 15:
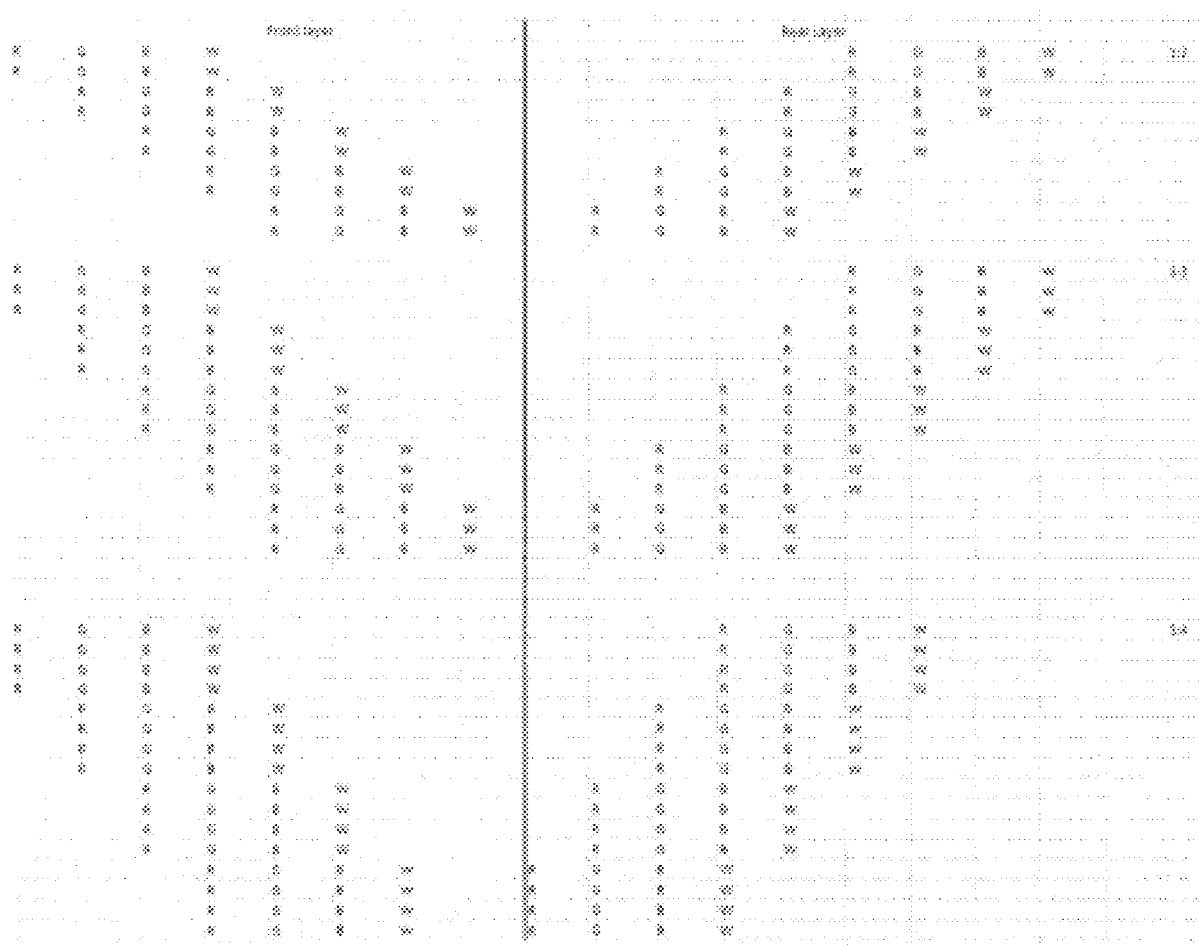
FIG. 15 is a top view of the color filter/pixel patterns of the front and rear displays, which are different from each other, according to another example embodiment of this invention (the pattern of the front display being on the left side of FIG. 15, and the pattern of the rear display being on the right side of FIG. 15)

FIG. 15 illustrates another example embodiment of this invention. The pixel/color filter pattern of a first display is shown on the left side of FIG. 15, and the pixel/color filter pattern of the other display of a MLD is shown on the right side of FIG. 15. The LCD on the left side of FIG. 15 may be one of the displays or display layers in the MLD of FIG. 16, and the LCD on the right side of FIG. 15 may be the other of the displays or display layers in the MLD of FIG. 16. The illustrated front layer would be overlaid over the illustrated rear layer, as viewed from the point of view of the viewer of the display. In particular, the left-most column of the "front layer" would overlap the left-most column of the "rear layer," and/or the right-most column of the front layer would overlap the right-most column of the rear layer. In the left side pattern (e.g., front display or front display layer 1), colored filter/area lines are oriented from the upper left to the lower right with respect to R, G, B, and W colors. On the other hand, in the right side pattern (e.g., rear display or rear display layer 2) of FIG. 15, colored filter/area lines are oriented from the upper right to the lower left with respect to R, G, B, and W colors. Thus, the colored lines formed by the color filters/areas in the different display panels are angled from each other by from approximately 45-120 degrees at least in some instances. FIG. 15 illustrates three dithered RGBW sub-pixel configurations on the front layer (left column in the figure) and rear layer (right column in the figure) when looking down at the display from the point of view of the viewer of the MLD stack. It can be seen that when the front and rear layers 1 and 2 are superimposed in an overlapped manner (e.g., see FIG. 16), the overlapping stripe patterns formed in the diagonal directions do not form large banded intersection regions and therefore the appearance of moire interference is reduced or minimized.

FIG. 16 illustrates a MLD according to an example embodiment of this invention, in which the stacked overlapping layers/displays of any of FIGS. 1-15 may be provided. The first display or display layer of the MLD may be element 1 (or 2), and the second display or display layer of the MLD may be element 2 (or 1). FIG. 16 illustrates an example where the stacked display panels 1, 2 (e.g., LCDs or OLEDs) may be rotated relative to each other, or otherwise have different pixel/colored area patterns, when viewed from above. Display or display layer 2 is closest to the backlight of the MLD, and it may be desirable to have its backplane facing the backlight system to recycle light that may pass through row drivers, column drivers, transistors, and storage capacitance lines into the backlight. A two polarizer configuration may be used, as shown in the figure, and gaps may be designed to include air or material having birefringence designed to maintain black state of the display when desired. The gap may include material having a refractive index matched closely to glass or the layers on either side to reduce internal reflection and/or depolarization effects. For the front display or display layer 1, its backplane may be oriented opposite to that of display or display layer 2. In particular, for the front display 1 its backplane may be oriented to face the viewer to reduce internal reflections. Thus, it can be seen in FIG. 16 that the color filter layers (each of which may be made up of one or more layers) of the respective displays 1 and 2 face each other, with no liquid crystal layer from either display being located between the color filter layers of the first and second displays. In certain example embodiments, to reduce external reflections of ambient light, there may be provided an antireflective system such as that shown in FIG. 16 made up of quarter wave retarder and an antireflective polarizer, so that ambient light that would normally be reflected would undergo a quarter wave rotation on the first pass through the AR polarizer, is reflected by the backplane elements, undergoes a second rotation through the quarter wavelength retarder. By the time it goes through this second rotation, it is substantially orthogonal to the transmission axis of the AR polarizer and thus will be substantially absorbed. Additionally, black mask (BM) or other non-reflective material may be added behind the conductive traces of the displays to reduce reflections. Additionally, antireflective (AR) coating(s) may be applied to the interior surfaces in certain example embodiments of this invention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In certain example embodiments of this invention, there is provided a display device comprising: a first display in a first plane for displaying a first image; a second display in a second plane for displaying a second image, wherein said first and second planes are approximately parallel to each other; and wherein the first and second displays have different color filter patterns, respectively, as viewed from a point of view of a viewer of the display device, in order to reduce moiré interference.

In the display device of the immediately preceding paragraph, green color filters in the first display may be oriented in lines in a first direction, and green color filters in the second display may be oriented in lines in a second direction, the first and second green color directions being different from each other. The first and second green color directions may be angled from each other by from about 30-90 degrees.

In the display device of any of the preceding two paragraphs, red color filters in the first display may be oriented in lines in a first direction, and red color filters in the second display may be oriented in lines in a second direction, the first and second red color directions being different from each other. The first and second red color directions may be angled from each other by from about 30-90 degrees.

In the display device of any of the preceding three paragraphs, blue color filters in the first display may be oriented in lines in a first direction, and blue color filters in the second display may be oriented in lines in a second direction, the first and second blue color directions being different from each other. The first and second blue color directions may be angled from each other by from about 30-90 degrees. Moreover, the red, green and blue color directions may all be parallel or substantially parallel to each other.

In the display device of any of the preceding four paragraphs, in the first display at least one of red, green and blue color filters may form a colored line in a diagonal direction, and in the second display red, green and blue color filters may form respective red, green and blue lines in vertical or horizontal directions but not in a diagonal direction.

In the display device of any of the preceding five paragraphs, in the first display red, green and blue color filters may form respective red, green and blue lines in a diagonal direction, and in the second display red, green and blue color filters may form respective red, green and blue lines in vertical or horizontal directions but not in a diagonal direction.

In the display device of any of the preceding six paragraphs, color filters in at least one of the first and second displays may be dithered.

In the display device of any of the preceding seven paragraphs, each of the first and second displays may comprises color filters that are arranged in multiple different dithered patterns.

In the display device of any of the preceding eight paragraphs, the first and second displays may comprise liquid crystal displays or OLEDs.

In the display device of any of the preceding nine paragraphs, the first display may comprise a front display or a rear display.

In the display device of any of the preceding ten paragraphs, a black matrix may be provided behind metal patterns in at least one of the displays in order to reduce and/or prevent reflections.

In the display device of any of the preceding eleven paragraphs, the first and second displays may be liquid crystal displays each comprising a liquid crystal layer, wherein the first liquid crystal display comprises a color filter layer comprising color filters, and the second liquid crystal display comprises a color filter layer comprising color filters, and wherein the color filter layers of the first and second liquid crystal displays face each other so that no liquid crystal layer is located between the color filter layers of the first and second liquid crystal displays in the display device.

Embodiments according to the present disclosure are thus described. While the present disclosure has been described in particular embodiments, it should be appreciated that the disclosure should not be construed as limited by such embodiments.

The invention claimed is:

1. A method for displaying images via a display apparatus, the method comprising:
   providing a first display in a first plane and displaying a first image;
   providing a second display in a second plane and displaying a second image, wherein said first and second planes are approximately parallel to each other;
   wherein the first and second displays have different pixel patterns, respectively, as viewed from a point of view of a viewer of the display apparatus, wherein green color filters in the first display are oriented in lines in a first direction, and green color filters in the second display are oriented in lines in a second direction, the first and second green color directions being different from each other.

2. The method of claim 1, wherein said first display comprises a front display.

3. The method of claim 1, wherein said first display comprises a rear display.

4. The method of claim 1, wherein a black matrix is provided behind metal patterns in at least one of the displays.

5. The method of claim 1, wherein the black matrix is made of substantially non-reflective material and is opaque.

* * * * *